(12) United States Patent
Kang et al.

(10) Patent No.: US 11,830,631 B2
(45) Date of Patent: Nov. 28, 2023

(54) NUCLEAR REACTOR COOLING SYSTEM THAT CAN DISCHARGE STEAM INTO REFUELING WATER

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Kyungjun Kang, Iksan-si (KR); Jihan Chun, Daejeon (KR); Hanok Kang, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

( * ) Notice: Subject to any disclaimer, the term of this patent is extended or adjusted under 35 U.S.C. 154(b) by 250 days.

(21) Appl. No.: 17/273,536

(22) PCT Filed: Aug. 19, 2019

(86) PCT No.: PCT/KR2019/010503
§ 371 (c)(1),
(2) Date: Mar. 4, 2021

(87) PCT Pub. No.: WO2020/050519
PCT Pub. Date: Mar. 12, 2020

(65) Prior Publication Data
US 2021/0193340 A1     Jun. 24, 2021

(30) Foreign Application Priority Data

Sep. 4, 2018 (KR) .................. 10-2018-0105463
Aug. 19, 2019 (KR) .................. 10-2019-0101167

(51) Int. Cl.
*G21C 15/18* (2006.01)
*G21C 15/12* (2006.01)
(Continued)

(52) U.S. Cl.
CPC ............. *G21C 15/18* (2013.01); *G21C 15/12* (2013.01); *G21C 13/028* (2013.01); *G21C 15/16* (2013.01); *G21C 15/243* (2013.01)

(58) Field of Classification Search
CPC ........ G21C 15/18; G21C 15/12; G21C 15/16; G21C 15/243
(Continued)

(56) References Cited

U.S. PATENT DOCUMENTS

2015/0221403 A1* 8/2015 Kim ...................... G21C 15/18
376/294
2016/0247585 A1  8/2016 Han et al.

FOREIGN PATENT DOCUMENTS

JP    H06-342093 A    12/1994
KR   101382256 B1     4/2014
(Continued)

OTHER PUBLICATIONS

International Search Report dated Dec. 10, 2019 issued in PCT/KR2019/010503.
(Continued)

*Primary Examiner* — Jack W Keith
*Assistant Examiner* — Daniel Wasil
(74) *Attorney, Agent, or Firm* — Scully, Scott, Murphy & Presser, P.C.

(57) ABSTRACT

A nuclear reactor cooling system comprises a containment area, an In-Containment Refueling Water Storage Tank (IRWST), and a discharge pipe. The containment area is formed to enclose a reactor coolant system. The IRWST is disposed outside the containment area. The discharge pipe
(Continued)

discharges steam from the containment area to refueling water in the IRWST when an accident occurs. A steam intake pipe has one end in fluid connection with an upper space of the IRWST, and another end in fluid connection with a radioactive substance reduction tank which stores cooling water. The steam intake pipe allows steam to flow from the upper space of the IRWST into the cooling water in the reduction tank.

18 Claims, 6 Drawing Sheets

(51) Int. Cl.
    *G21C 13/028*     (2006.01)
    *G21C 15/16*     (2006.01)
    *G21C 15/243*     (2006.01)

(58) Field of Classification Search
    USPC .......................................................... 376/299
    See application file for complete search history.

(56) References Cited

FOREIGN PATENT DOCUMENTS

| KR | 1020140126187 A | 10/2014 |
|----|-----------------|---------|
| KR | 101538932 B1 | 7/2015 |
| KR | 101601743 B1 | 3/2016 |
| KR | 1020180047849 A | 5/2018 |

OTHER PUBLICATIONS

Corradini, M.L., "Advanced Nuclear Energy Systems: Heat Transfer Issues and Trends", Rohsenow Symposium on Future Trends in Heat Transfer: MIT, May 16, 2003, pp. 1-14.

Kawaguchi et al., "Long-Term Cooling Strategy for the Primary Containment Vessel of the Kashiwazaki-Kariwa Nuclear Power Station in a Severe Accident", 2017 25th International Conference on Nuclear Engineering, vol. 7: Fuel Cycle, Decontamination and Decommissioning, Radiation Protection, Shielding, and Waste Management; Mitigation Strategies for Beyond Design Basis Events, Shanghai, China, Jul. 2-6, 2017.

\* cited by examiner

[Fig. 1a]
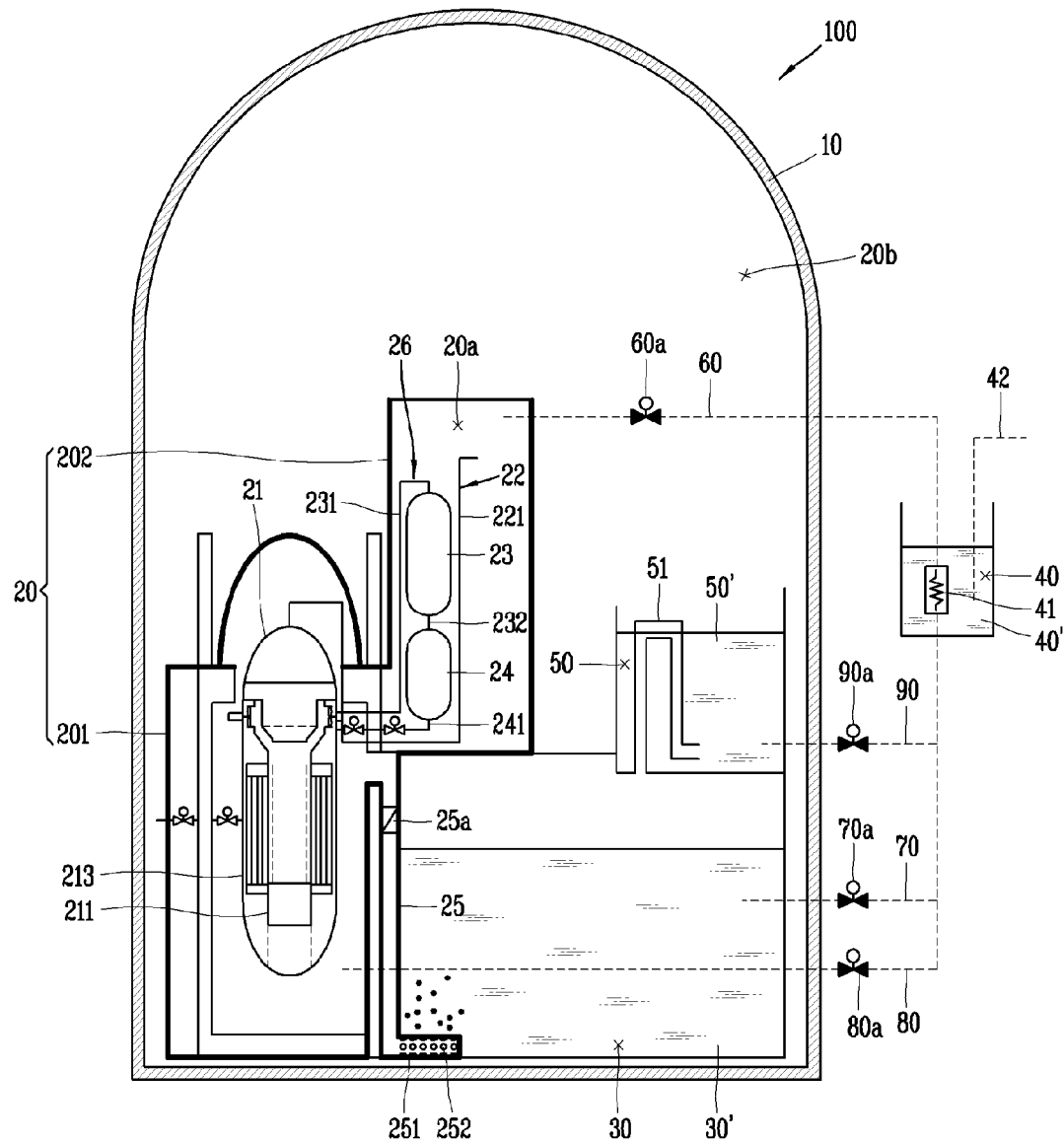

[Fig. 1b]
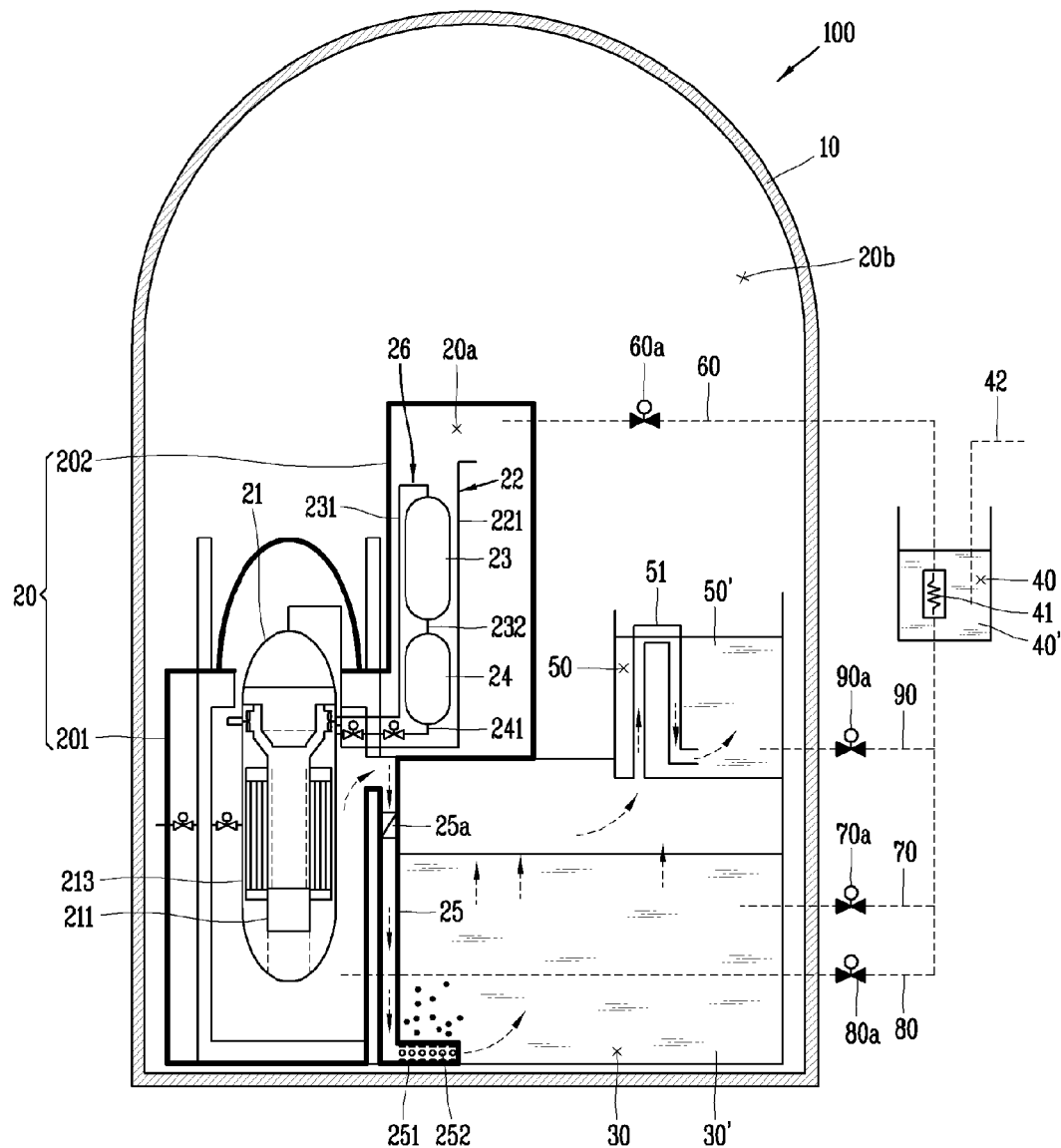

[Fig. 1c]
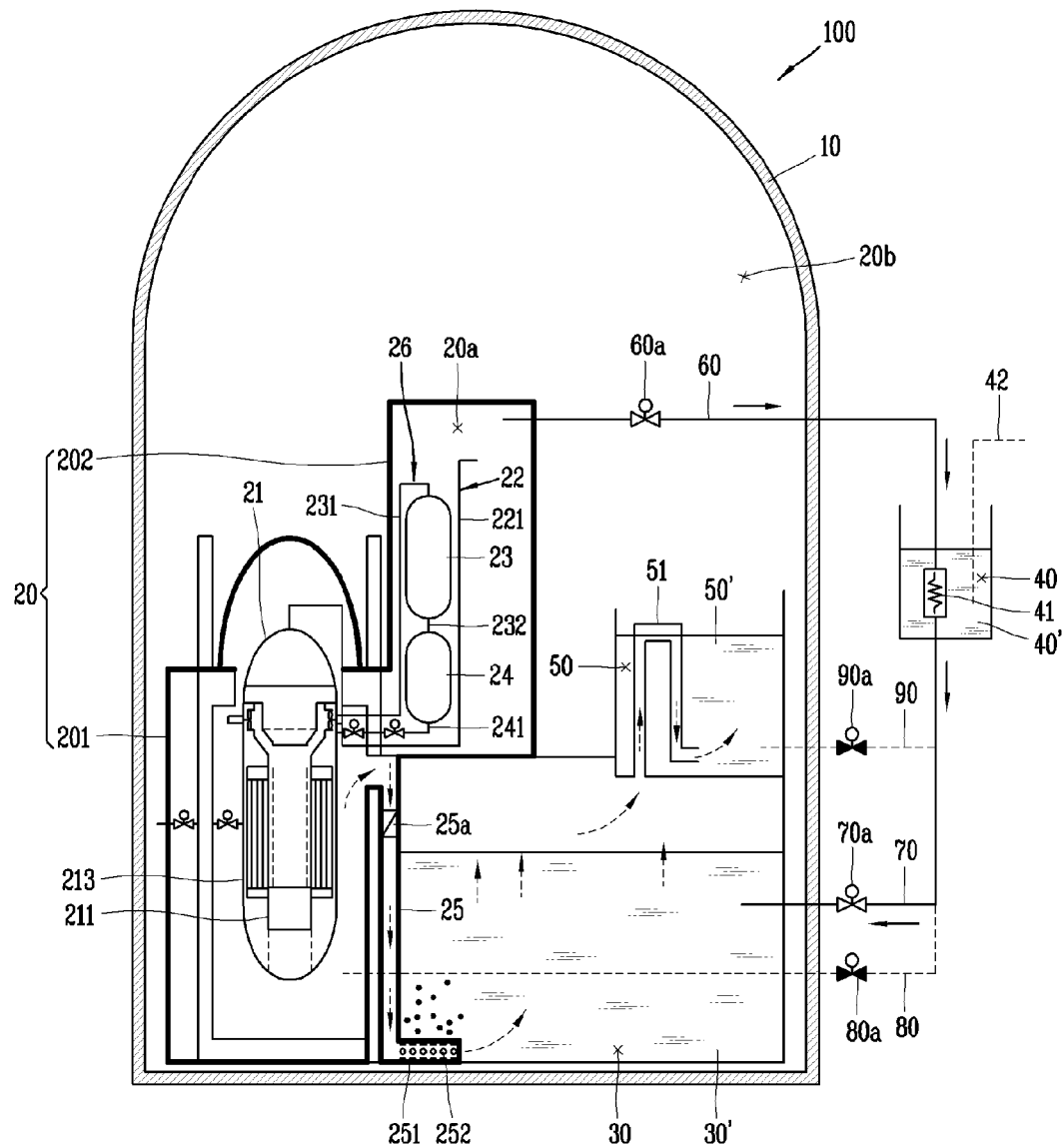

[Fig. 1d]
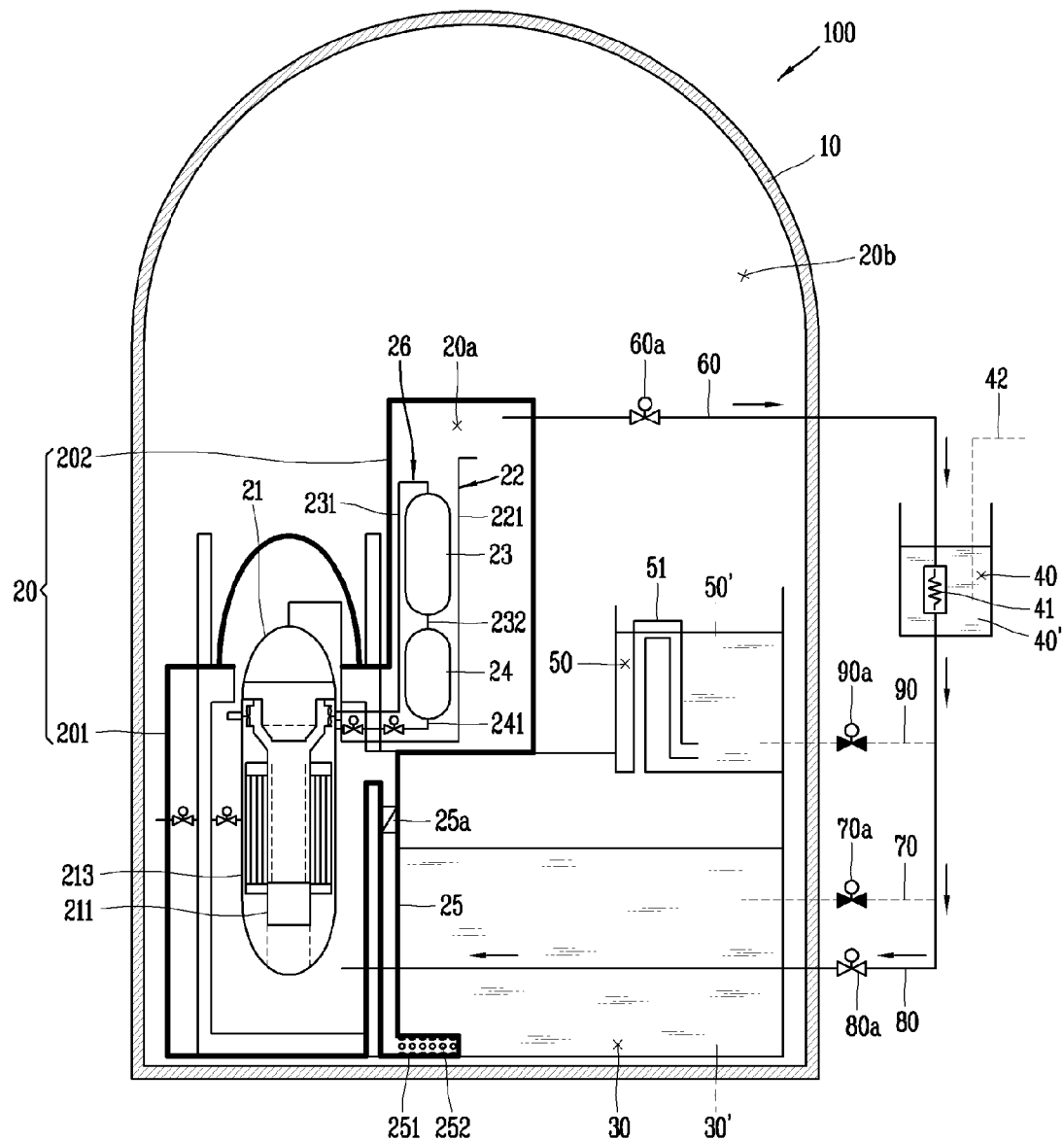

[Fig. 2]
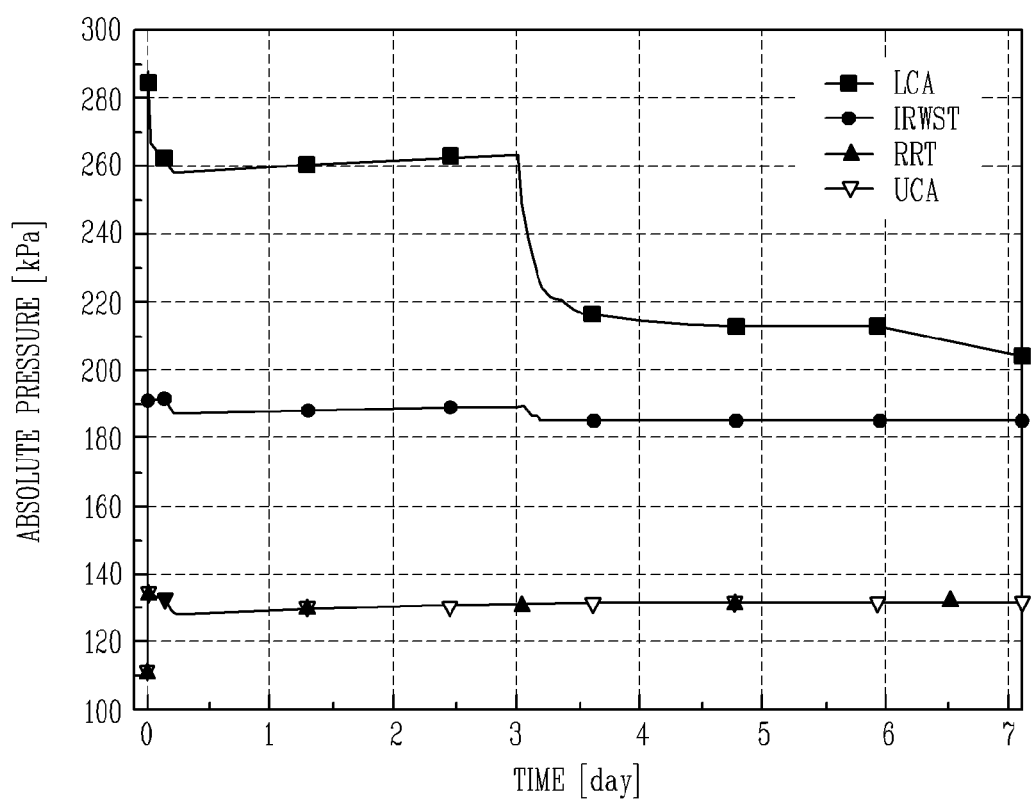

[Fig. 3]
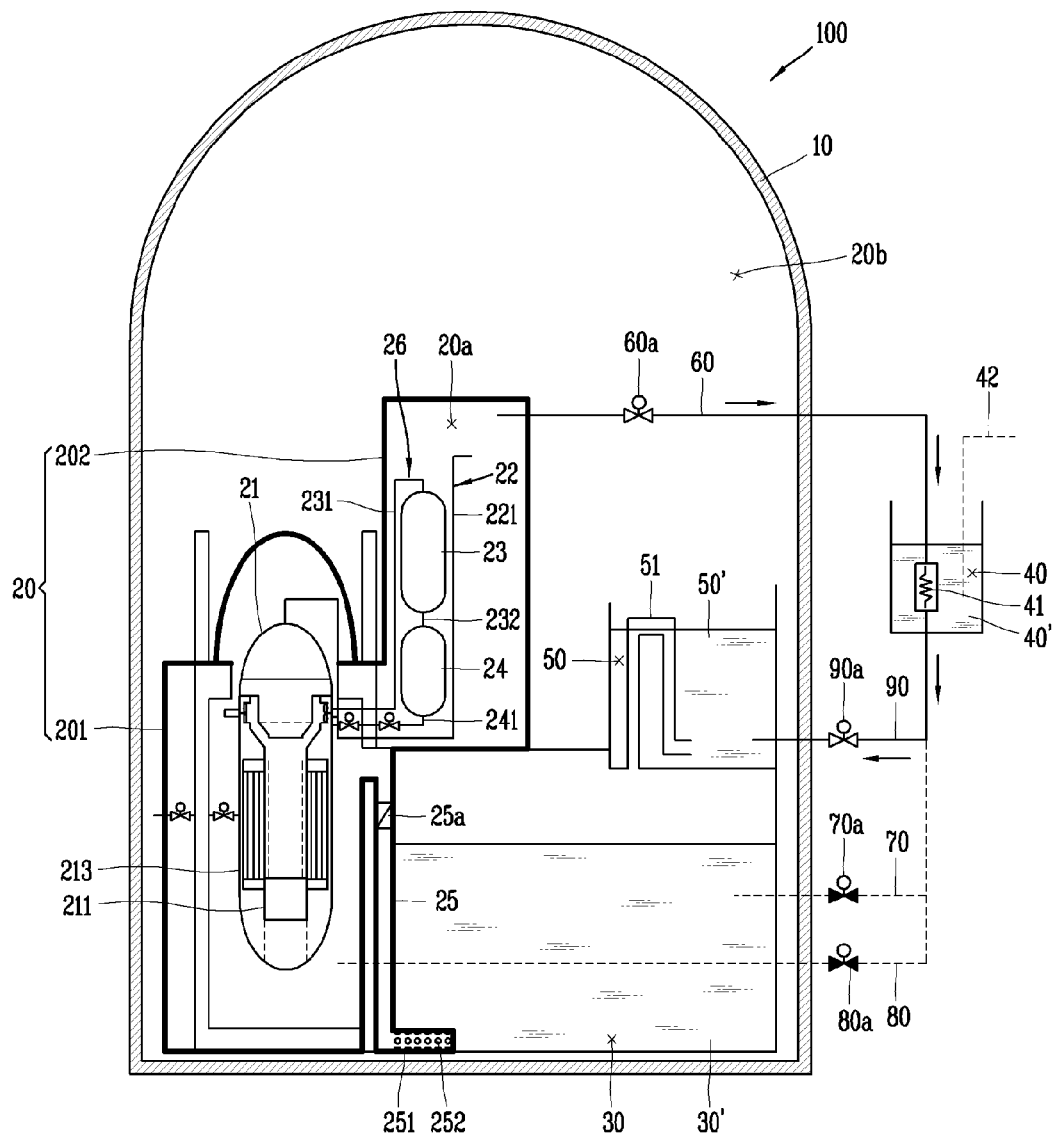

NUCLEAR REACTOR COOLING SYSTEM THAT CAN DISCHARGE STEAM INTO REFUELING WATER

TECHNICAL FIELD

The present invention relates to a nuclear reactor long-term cooling system capable of enhancing the safety of a nuclear plant, and a nuclear plant having the same.

BACKGROUND ART

A nuclear reactor is categorized into a separate nuclear reactor (e.g., a commercial nuclear reactor: domestic) where main apparatuses (a steam generator, a pressurizer, a pump, etc.) are installed outside a nuclear reactor vessel, and an integral nuclear reactor (e.g., a SMART nuclear reactor: domestic) where main apparatuses are installed inside the nuclear reactor vessel, according to an installation position of the main apparatuses.

Especially, the integral nuclear reactor has a characteristic to exclude weaknesses which may occur at connection portions among systems. More specifically, in the conventional separate nuclear reactor, a heat exchanger, a cooling device, a steam generator, and a pressurizer are connected to each other by pipes. And the integral nuclear reactor has been devised to improve the weaknesses such as a breakdown of pipes.

The nuclear reactor is categorized into an active nuclear reactor and a passive nuclear reactor according to an implementation method of a safety system. The active nuclear reactor uses an active device such as a pump operated by a power of an emergency generator, etc. so as to drive a safety system. On the other hand, the passive nuclear reactor uses a passive device operated by a passive force such as a gravitational force or a gas pressure, so as to drive a safety system.

In the passive nuclear reactor, a passive safety system can safely maintain the nuclear reactor, only with a natural force mounted therein, without a driving source or an alternating current (AC) power source of a safety class such as an emergency diesel generator, for a predetermined time (three days, 72 hours) requested by restriction requirements when an accident occurs. And the passive safety system can safely maintain its power source or an emergency direct current (DC) power source by utilizing a driving source or a non-safety system after 72 hours.

However, even if three days requested by restriction requirements lapse after an accident occurrence, residual heat is generated from a core of the nuclear reactor of a nuclear power plant for a considerable time. Different from a general thermal power plant where heat generation is stopped if fuel supply is stopped, even if a nuclear fission reaction is stopped at a core (nuclear fuel) into which a control rod has been inserted, residual heat is generated from the core, by nuclear fission products produced and accumulated during a normal operation. Accordingly, various safety systems for removing residual heat of a core when an accident occurs are installed at a nuclear plant.

A passive nuclear plant developed or being developed for enhanced safety of a nuclear plant (US Westinghouse AP1000, Korean SMART) can safely process a nuclear accident by introducing a passive force such as a gas pressure or a gravitational force, in order to exclude an active device such as a pump which requires a large amount of electricity.

Especially, a nuclear plant may perform a long-term cooling operation for removing residual heat when an accident occurs. The conventional nuclear reactor has performed a long-term cooling operation with large-scale cooling facilities using sea water. However, such large-scale cooling facilities using sea water resulted in increasing construction costs of a nuclear plant.

Further, a long-term cooling operation using sea water can be performed only when there is sea water nearby, which restricted on conditions of a site of a nuclear plant. Further, a long-term cooling operation using sea water should be provided with a pump to use sea water as a cooling source. Here, if the pump cannot be operated, a long-term cooling operation cannot be performed. This may cause a major incident such as a fuel meltdown or a hydrogen explosion.

Accordingly, the present invention needs a nuclear reactor long-term cooling system capable of excluding the conventional large-scale cooling facilities using sea water when a nuclear accident occurs.

DISCLOSURE OF INVENTION

Technical Problem

An object of the present disclosure is to provide a nuclear reactor long-term cooling system and a nuclear plant having the same, the nuclear reactor long-term cooling system capable of enhancing the safety by performing a long-term cooling operation by excluding large-scale facilities for sea water cooling, and by utilizing a safety system inside a nuclear plant.

Solution to Problem

To achieve the above purpose, a nuclear reactor long-term cooling system according to the present invention comprises: a lower containment area formed to enclose a reactor coolant system, and configured to prevent steam containing radioactive substances generated from the reactor coolant system from leaking to a path other than a discharge unit; an In-Containment Refueling Water Storage Tank (IRWST) disposed outside the lower containment area, and having refueling water stored therein; and a discharge pipe configured to connect the lower containment area to the IRWST, and to discharge steam of the lower containment area to the refueling water when an accident occurs.

In an embodiment of the present invention, the nuclear reactor long-term cooling system may further comprise an injection portion formed at an end part of the discharge pipe and configured to inject the steam which flows along the discharge pipe to the refueling water.

In an embodiment of the present invention, one side of the discharge pipe may be connected to the first lower containment area which is at a higher position than a level of the refueling water, and another side thereof may be connected to a lower part of the IRWST which is at a lower position than the level. And the steam may be discharged to the refueling water by a difference between an internal pressure of the lower containment area and a pressure of said another side of the discharge pipe.

In an embodiment of the present invention, the injection portion may be arranged near a bottom surface of the IRWST, be extended in parallel to the bottom surface, and be provided with a plurality of injection holes.

In an embodiment of the present invention, a check valve may be installed at the discharge pipe so as to prevent a backflow of the refueling water from the IRWST to the lower containment area.

In an embodiment of the present invention, the lower containment area may include: a first lower containment area formed to enclose the reactor coolant system; and a second lower containment area communicated with the first lower containment area, and formed to enclose a safety injection system for safely injecting emergency cooling water to the reactor coolant system when an accident occurs.

In an embodiment of the present invention, the safety injection system may be provided with at least one of a safety injection tank and a core makeup tank each connected to the reactor coolant system.

In an embodiment of the present invention, the second lower containment area may be disposed at a higher position than the first lower containment area. An automatic depressurization system for lowering a pressure of the reactor coolant system may be accommodated in the second lower containment area. And one side of the automatic depressurization system may be connected to an upper part of the reactor coolant system, another side thereof may be extended to an upper part of the second lower containment area, and the automatic depressurization system may be configured to discharge steam of the reactor coolant system to the second lower containment area from the first lower containment area.

In an embodiment of the present invention, the nuclear reactor long-term cooling system may further comprises: a containment formed to enclose the lower containment area, and serving as a final containment to reduce radioactive substances; and an emergency cooling tank having therein a heat exchanger for heat-exchanging with steam transmitted from the lower containment area.

In an embodiment of the present invention, the emergency cooling tank may be arranged at a higher position than the IRWST outside the containment.

In an embodiment of the present invention, the emergency cooling tank may store therein emergency cooling water for heat-exchange with the heat exchanger. And the emergency cooling tank may further include therein a cooling water supplement pipe for supplementing emergency cooling water supplied from the outside.

In an embodiment of the present invention, the nuclear reactor long-term cooling system may further comprise: a steam pipe configured to connect the lower containment area to the heat exchanger; and a first recovery pipe configured to connect the heat exchanger to the IRWST, and disposed at a higher position than the injection portion from a bottom surface of the IRWST.

In an embodiment of the present invention, the discharge pipe may discharge the steam from the lower containment area to the refueling water at an early stage of an accident. And the steam may be discharged to the refueling water through the discharge pipe and the first recovery pipe, respectively in a preset time after the early stage of the accident.

In an embodiment of the present invention, the steam of the lower containment area may be discharged to the refueling water through the discharge pipe to thus be condensed, and the steam discharge through the discharge pipe may be stopped as a water level of the IRWST is increased. And the steam of the lower containment area may be introduced into the heat exchanger along the steam pipe to thus be condensed by heat exchange.

In an embodiment of the present invention, the nuclear reactor long-term cooling system may further comprise a second recovery pipe configured to connect the heat exchanger to a lower part of the lower containment area, extended by passing through the IRWST, and configured to heat-exchange steam condensed by the heat exchanger with the refueling water and collect the steam to the lower part of the lower containment area.

In an embodiment of the present invention, the nuclear reactor long-term cooling system may further comprise: a radioactive substance reduction tank disposed at a higher position than the IRWST in a spaced manner in the containment, and configured to store therein cooling water; and a steam intake pipe having one side connected to an upper space of the IRWST, and another side extended to inside of the radioactive substance reduction tank, and configured to introduce steam discharged to the upper space from the IRWST into the cooling water of the radioactive substance reduction tank.

In an embodiment of the present invention, the steam intake pipe may include: a first steam intake pipe upward extended from a bottom surface of the radioactive substance reduction tank, above a water surface of the radioactive substance reduction tank; and a second steam intake pipe having one side connected to an upper end of the first steam intake pipe, and another side downward extended to the bottom surface of the radioactive substance reduction tank so as to be adjacent to the bottom surface, and communicated with the inside of the radioactive substance reduction tank.

In an embodiment of the present invention, the nuclear reactor long-term cooling system may further comprise a third recovery pipe configured to connect the heat exchanger to the radioactive substance reduction tank, and to discharge steam condensed by the heat exchanger to the radioactive substance reduction tank.

In the present invention, there is provided a nuclear plant, comprising: a reactor coolant system; a lower containment area formed to enclose the reactor coolant system, and having a first space for accommodating the reactor coolant system therein; a containment formed to enclose the lower containment area, and having a second space for accommodating the lower containment area therein; an In-Containment Refueling Water Storage Tank (IRWST) disposed at a lower part of a second space between the lower containment area and the containment, and configured to store refueling water therein; and a reactor long-term cooling system configured to discharge steam containing radioactive substances generated from the lower containment area when an accident occurs, to outside of the lower containment area, and to condense the steam.

In an embodiment of the nuclear plant according to the present invention, the reactor long-term cooling system may include a discharge pipe having one side connected to one side of the lower containment area which is at a higher position than a bottom surface of the IRWST, and another side adjacent to and connected to the bottom surface of the IRWST, the discharge pipe configured to discharge the steam inside the lower containment area to the refueling water when an accident occurs.

In an embodiment of the nuclear plant according to the present invention, the reactor long-term cooling system may further include an emergency cooling tank disposed outside the containment, having therein a heat exchanger, and configured to cool the steam transmitted from the lower containment area by heat-exchanging the steam with emergency cooling water.

In an embodiment of the nuclear plant according to the present invention, the reactor long-term cooling system may further include a first recovery pipe configured to connect the heat exchanger to the IRWST. The reactor long-term cooling system may discharge steam generated from the lower containment area to the refueling water of the IRWST through the discharge pipe, at an early stage of an accident. And the reactor long-term cooling system may discharge the steam of the lower containment area to the refueling water through the discharge pipe, and may collect the steam condensed by the heat exchanger to the IRWST through the first recovery pipe, in a preset time after the early stage of the accident.

In an embodiment of the nuclear plant according to the present invention, the steam of the lower containment area may be discharged to the refueling water of the IRWST through the discharge pipe and the first recovery pipe, the steam discharge through the discharge pipe may be stopped as a water level of the IRWST is increased, and the steam introduced into the heat exchanger may be condensed by the emergency cooling water of the emergency cooling tank.

In an embodiment of the nuclear plant according to the present invention, the reactor long-term cooling system may further include a second recovery pipe connected to a lower part of the lower containment area from the heat exchanger by passing through the IRWST. And the reactor long-term cooling system may heat-exchange the steam condensed by the heat exchanger with the refueling water through the second recovery pipe, and may collect condensation water to the lower containment area, in a preset time after the accident.

Advantageous Effects of Invention

The reactor long-term cooling system and the nuclear plant having the same according to the present disclosure may have the following effects.

Firstly, the discharge pipe is connected to the lower containment area and the IRWST, and steam inside the lower containment area is discharged to the refueling water of the IRWST through the discharge pipe by a difference between an internal pressure of the lower containment area and a water pressure of the IRWST. This can allow a long-term cooling operation of the nuclear plant, without using the conventional large-scale seawater cooling facilities when a nuclear accident such as a steam pipe breakdown accident occurs. This can enhance the safety of the nuclear plant, because there is no long-term cooling inability due to a breakdown of the conventional seawater pump. Since the conventional large-scale cooling facilities using sea water are not required, construction costs of the nuclear plant can be saved. Further, even when there is no sea water, the nuclear plant can be constructed, and limited conditions of a site of the nuclear plant can be mitigated.

Secondly, the emergency cooling tank is communicated with the upper part of the lower containment area through the steam pipe, and accommodates therein a heat exchanger and emergency cooling water. The emergency cooling tank heat-exchanges steam of the lower containment area with the emergency cooling water through the heat exchanger, even when the discharge pipe cannot be operated due to a level increase of the refueling water during a long-term cooling operation. This can allow a long-term cooling operation of the nuclear plant.

Thirdly, the first recovery pipe is connected to the heat exchanger and the IRWST, and steam of the lower containment area condensed by the heat exchanger is discharged to the refueling water. This can allow a long-term cooling operation of the nuclear plant.

Fourthly, the second recovery pipe is connected to the heat exchanger and the lower containment area, and is extended by passing through the IRWST. And steam of the lower containment area condensed by the heat exchanger is heat-exchanged with the refueling water, and then is collected into the lower containment area. As a result, a cooling circulation of the steam is repeated, and a long-term cooling operation of the nuclear plant can be performed.

Fifthly, the radioactive substance reduction tank is arranged above the IRWST, and accommodates therein cooling water and the steam intake pipe communicated with the upper space of the IRWST. And non-condensed steam of the IRWST is discharged to the IRWST through the steam intake pipe. This can reduce radioactive substances.

Sixthly, the third recovery pipe is connected to the heat exchanger and the radioactive substance reduction tank, and steam of the lower containment area condensed by the heat exchanger is collected to the radioactive substance reduction tank. This can reduce radioactive substances contained in steam, and can perform a long-term cooling circulation.

BRIEF DESCRIPTION OF DRAWINGS

FIG. 1A is a conceptual view showing a nuclear plant having a nuclear reactor long-term cooling system according to the present disclosure;

FIG. 1B is an operational state view showing that steam of a lower containment area is discharged to an In-Containment Refueling Water Storage Tank (IRWST) through a discharge pipe at an early stage of a nuclear accident in FIG. 1A;

FIG. 1C is an operational state view showing that steam of a lower containment area is discharged to an In-Containment Refueling Water Storage Tank (IRWST) through a discharge pipe and a first recovery pipe in a predetermined time after a nuclear accident in FIG. 1A;

FIG. 1D is an operational state view showing that steam of a lower containment area is discharged to an In-Containment Refueling Water Storage Tank (IRWST) through a second recovery pipe via an emergency cooling tank (ECT) in three days after a nuclear accident in FIG. 1A;

FIG. 2 is a graph showing a change of a pressure according to a time at the time of cooling by a nuclear reactor long-term cooling system of the present disclosure; and FIG. 3 is an operational state view showing that steam of a lower containment area is discharged to a radioactive substance reduction tank through a third recovery pipe via an emergency cooling tank (ECT) when a severe nuclear accident occurs in FIG. 1A.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Before explaining a long-term cooling system of a nuclear plant according to the present invention, a nuclear plant 100 according to the present disclosure may be explained.

FIG. 1A is a conceptual view showing a nuclear plant 100 having a nuclear reactor long-term cooling system according to the present disclosure.

Referring to FIG. 1A, the nuclear plant 100 includes a containment 10, a lower containment area 20, an In-Containment Refueling Water Storage Tank (IRWST) 30, an Emergency Cooling Tank (ECT) 40, and a radioactive substance reduction tank 50.

The containment 10 forms a final containment which encloses the lower containment area 20 so as to prevent leakage of a radioactive substance. The containment 10 of the present disclosure refers to a containment building, a nuclear reactor building, a containment vessel, a safety protection vessel, etc. The containment 10 may be referred to as an Upper Containment Area (UCA) for reducing radioactive substances.

The lower containment area 20 may be referred to as a Lower Containment Area (LCA) for reducing radioactive substances. The lower containment area 20 is provided in the containment 10. The lower containment area 20 may separate a first space 20a and a second space 20b from each other. The first space 20a accommodates a reactor coolant system 21 therein. The second space 20b is formed between the first space 20a and the containment 10. More specifically, the second space 20b may be formed as a large space when compared to the first space 20a. Further, the first space 20a may be referred to as the inside of the lower containment area 20, and the second space 20b may be referred to as the outside of the lower containment area 20. The second space 20b is formed in the containment 10.

The lower containment area 20 may include a first lower containment area 201 and a second lower containment area 202. The first lower containment area 201 accommodates the reactor coolant system 21 therein. And the second lower containment area 202 is formed to be communicated with an upper part of the first lower containment area 201.

The reactor coolant system 21 is accommodated in a refueling pool. An opening is formed at an upper part of the refueling pool. A CPRSS cover is installed to open and close the opening of the refueling pool. The CPRSS is a Containment Pressure and Radioactivity Suppression System.

In the lower containment area 20, may be accommodated the reactor coolant system 21 having a core 211 and a steam generator, an Automatic Depressurization System (ADS) 22, a Safety Injection Tank (SIT) 23, a Core Makeup Tank (CMT) 24, a discharge pipe 25 and a check valve 25a. The discharge pipe 25 and the check valve 25a may be arranged at one side of the lower containment area 20. For instance, the discharge pipe 25 may be arranged between one side of the lower containment area 20 and the IRWST 30.

The discharge pipe 25 may be arranged between the first space 20a and the second space 20b, or may be arranged at the second space 20b.

The reactor coolant system 21 is configured to remove heat from the core 211 and the inner structures by circulating cooling water, and to transmit the heat generated from the core 211 to the steam generator. The reactor coolant system 21 refers to a reactor vessel in case of an integral reactor. A reactor coolant pump 212 may be provided in the reactor vessel. The reactor coolant pump 212 may transmit cooling water to a primary flow path of the steam generator through a forcible circulation. A pressurizer may be installed at an upper part of the reactor vessel. The pressurizer serves to uniformly maintain a pressure of the reactor coolant system 21.

The second lower containment area 202 is configured to accommodate therein the Automatic Depressurization System (ADS) 22, the Safety Injection Tank (SIT) 23 and the Core Makeup Tank (CMT) 24. The second lower containment area 202 is upward extended from an upper part of the first lower containment area 201. A lower side of the second lower containment area 202 is connected to the upper part of the first lower containment area 201 so as to be communicated with each other.

The automatic depressurization system 22, the safety injection tank 23 and the core makeup tank 24 may form a passive safety injection system by being operated reciprocally when an accident occurs at the nuclear plant 100.

The automatic depressurization system 22 is formed to lower an internal pressure of the reactor coolant system 21 into a value less than a predetermined level, so as to prevent damage of the reactor coolant system 21 due to an overpressure when an overpressure accident occurs at the nuclear plant 100. The automatic depressurization system 22 may include a depressurization pipe 221 and a plurality of valves. One side of the automatic depressurization system 22 is connected to an upper end of a reactor vessel so as to be communicated with each other, and another side of the automatic depressurization system 22 is extended from an upper space of the first lower containment area 201 so as to be connected to an upper space of the second lower containment area 202. The automatic depressurization system 22 transmits steam of the reactor coolant system 21 to the upper space of the second lower containment area 202 when a pressure of the reactor coolant system 21 is increased into a level more than a preset value.

A safety injection system 26 is configured to inject safety injection water into the reactor coolant system 21 when an accident occurs. The safety injection tank 23 and the core makeup tank 24 are configured to inject safety injection water such as a boric acid solution, into the reactor coolant system 21.

Each of the safety injection tank 23 and the core makeup tank 24 may be connected to the reactor coolant system 21 by a pipe, in parallel or in series. In this embodiment, the safety injection tank 23 and the core makeup tank 24 are connected thereto in series.

The safety injection system 26 includes the safety injection tank 23, the core makeup tank 24, a pressure equilibrium pipe 231, and a safety injection pipe 241.

The safety injection tank 23 may be arranged above the core makeup tank 24. The safety injection tank 23 and the core makeup tank 24 may be connected to each other by a connection pipe 232 so as to be communicated with each other. Safety injection water (a boric acid solution) stored in the safety injection tank 23 may be injected into the core makeup tank 24 through the connection pipe 232.

One side of the pressure equilibrium pipe 231 may be connected to an upper end of the reactor coolant system 21 (reactor vessel in case of an integral reactor) so as to be communicated with each other, and another side thereof may be connected to an upper part of the safety injection tank 23 so as to be communicated with each other. The pressure equilibrium pipe 231 may serve to maintain a pressure equilibrium state between the reactor coolant system 21 and the safety injection tank 23. The safety injection tank 23 and the core makeup tank 24 may maintain a pressure equilibrium state through the connection pipe 232.

The safety injection pipe 241 is configured to connect a lower part of the core makeup tank 24 to the reactor vessel so as to be communicated with each other. Safety injection water may be injected into the reactor vessel from the core makeup tank 24 by gravity, through the safety injection pipe 241.

The safety injection tank 23 is disposed at a higher position than the reactor vessel. The discharge pipe 25 is configured to discharge steam of the lower containment area 20 to refueling water 30' accommodated in the In-Containment Refueling Water Storage Tank (IRWST) 30. One side of the discharge pipe 25 is communicated with the lower containment area 20, and another side of the discharge pipe 25 is communicated with the IRWST 30.

One side of the discharge pipe 25 is arranged at a higher position than another side of the discharge pipe 25. One side of the discharge pipe 25 is connected to an upper part of the first lower containment area 201 so as to be communicated with each other, and another side of the discharge pipe 25 is connected to a lower part of the IRWST 30 so as to be communicated with each other.

The check valve 25a may be installed at an upper side of the discharge pipe 25. The check valve 25a is operated by a difference between an internal pressure of the lower containment area 20 and a pressure of the refueling water of the IRWST 30. If the internal pressure of the lower containment area 20 is higher than the pressure of the IRWST 30, the check valve 25a is open. On the other hand, if the internal pressure of the lower containment area 20 is lower than the pressure of the IRWST 30, the check valve 25a is closed. The check valve 25a limits a flowing direction of steam inside the lower containment area 20, into one direction. The check valve 25a restricts steam inside the lower containment area 20 to move to the IRWST 30. That is, the check valve 25a prevents the refueling water of the IRWST 30 from moving to the lower containment area 20 along the discharge pipe 25.

An injection portion 251 may be provided at a lower side of the discharge pipe 25. The injection portion 251 is formed at the end of the discharge pipe 25. The injection portion 251 is configured to inject steam inside the lower containment area 20 which flows along the discharge pipe 25, to the refueling water. The injection portion 251 may be arranged near a bottom surface of the IRWST 30. The injection portion 251 may be extended in parallel to the bottom surface of the IRWST 30. The injection portion 251 is provided with a plurality of injection holes 252. The injection portion 251 may be configured to be immerged into the refueling water.

Thus, steam inside the lower containment area 20 may be discharged to the refueling water 30' accommodated in the IRWST 30 along the discharge pipe 25, by a pressure difference between the first space 20a and the second space 20b when an accident occurs at the nuclear plant 100. Here, the discharge pipe 25 is provided with the check valve 25a, and may prevent the refueling water 30' accommodated in the IRWST 30 from backflowing to the first space 20a.

The lower containment area 20 is installed in the containment 10, and separates the first space 20a for accommodating the reactor coolant system 21 therein, from the second space 20b formed between the lower containment area 20 and the containment 10. Further, the lower containment area 20 is formed to have a sealing structure to prevent steam and radioactive substances from leaking to the second space 20b when an accident occurs at the nuclear plant 100.

Thus, the first space 20a inside the lower containment area 20 may include steam or radioactive substances discharged when an accident such as a steam pipe breakdown accident or a coolant loss accident occurs at the nuclear plant 100. Here, the lower containment area 20 is formed to have a design pressure high enough to endure a pressure of vaporized steam when an accident occurs.

The refueling water 30' may be accommodated in the IRWST 30. When the nuclear plant 100 performs a refueling operation, a refueling water supplying pipe (not shown) for making refueling water flow between the IRWST 30 and the reactor coolant system 21 is connected. The refueling water supplying pipe may supply refueling water into the reactor coolant system 21.

The emergency cooling tank (ECT) 40 is arranged outside the containment 10. Emergency cooling water is stored in the ECT 40. An emergency cooling water injection pipe 42 may be connected to the ECT 40. One side of the emergency cooling water injection pipe 42 may be connected to an upper part of the ECT 40, and another side of the emergency cooling water injection pipe 42 may be connected to an external emergency cooling water supplying unit. Emergency cooling water may be injected into the ECT 40 through the emergency cooling water injection pipe 42.

The ECT 40 is configured to lower an inner temperature of the lower containment area 20 by condensing steam generated when an accident occurs at the nuclear plant 100. Steam generated when an accident occurs at the nuclear plant 100 is cooled by being heat-exchanged with emergency cooling water 40' accommodated in the ECT 40.

More specifically, steam generated when an accident occurs at the nuclear plant 100 is heat-exchanged with the emergency cooling water 40' by a heat exchanger 41 provided at the ECT 40. The heat exchanger 41 may form condensation water by cooling steam generated from the lower containment area 20 when an accident occurs, through a heat exchange. Thus, as steam generated when an accident occurs is cooled by losing heat, the inner temperature of the lower containment area 20 may be lowered. Further, cooling water may be supplemented to the ECT 40 by charging an external cooling water source with the emergency cooling water injection pipe 42.

The radioactive substance reduction tank 50 may be provided in the containment 10. The radioactive substance reduction tank 50 is provided at the second space 20b of the containment 10. Further, the radioactive substance reduction tank 50 is arranged above the IRWST 30.

The radioactive substance reduction tank 50 may be provided with a steam intake pipe 51 therein.

The steam intake pipe 51 may consist of a first steam intake pipe and a second steam intake pipe. The first steam intake pipe is upward extended from a bottom surface of the radioactive substance reduction tank 50, above a water surface. The second steam intake pipe is downward extended to the bottom surface of the radioactive substance reduction tank 50, from an upper part of the first steam intake pipe. The first and second steam intake pipes are connected to each other by a connection pipe having a shape of a reversed 'U'.

A lower side of the first steam intake pipe is connected to an upper space of the IRWST 30. An upper side of the first steam intake pipe is connected to an upper side of the second steam intake pipe. A lower side of the second steam intake pipe is connected to the inside of the radioactive substance reduction tank 50.

The upper space of the IRWST 30 may be sealed by being covered by a sealing cover.

Thus, steam or radioactive substances inside the IRWST 30 having its pressure increased when an accident occurs at the nuclear plant 100 may be injected into cooling water 50' accommodated in the radioactive substance reduction tank 50, while moving along the steam intake pipe 51.

Thus, the steam or radioactive substances above the IRWST 30 may be condensed by the cooling water 50'. Especially, radioactive substances may be solved by the cooling water 50' to thus be collected. Accordingly, the steam condensed by being injected to the cooling water 50' may be introduced into the second space 20b, thereby cooling the lower containment area 20 and lowering a concentration of the radioactive substances.

Further, in order to effectively reduce the radioactive substances in the cooling water 50', the cooling water 50' may be formed to accommodate therein refueling water of a pH more than a preset value, so as to prevent the volatility of the radioactive substances (especially, iodine). More specifically, the cooling water 50' may be formed to have the alkalinity. Further, a preset pH of the cooling water 50' may be 7, and may be preferably 7.5~10.

In addition, the containment 10, the lower containment area 20, the IRWST 30, the ECT 40, and the radioactive substance reduction tank 50 may be connected to one another by pipes.

More specifically, the nuclear plant 100 may be provided with a steam pipe 60 and first to third recovery pipes 70~90, and the first to third recovery pipes are provided with valves.

More specifically, the steam pipe 60 is configured to connect the lower containment area 20 to the heat exchanger 41. A steam valve 60a is provided on the steam pipe 60.

One side of the first recovery pipe 70 is connected to the heat exchange 41, and another side of the first recovery pipe 70 is connected to the inside of the IRWST 30. A first valve 70a is installed at the first recovery pipe 70 so as to open and close the first recovery pipe 70. The first recovery pipe 70 is extended from the heat exchanger 41, and is configured to discharge steam and condensation water to the refueling water 30' accommodated in the IRWST 30.

Further, another side of the first recovery pipe 70 is arranged so that a separation distance from the bottom surface of the IRWST 30 is longer than that of the aforementioned injection portion 251 formed at the end of the discharge pipe 25. Accordingly, steam or condensation water condensed at the heat exchanger 41 may be discharged to the IRWST 30, through the first recovery pipe 70, even by a pressure difference smaller than a pressure difference for operating the check valve 25a of the discharge pipe 25.

One side of the second recovery pipe 80 may be connected to the heat exchanger 41, and another side of the second recovery pipe 80 may be horizontally extended to pass through the IRWST 30 and may be connected to the inside of the lower containment area 20. A second valve 80a is installed at the second recovery pipe 80 so as to open and close the second recovery pipe 80.

Steam or condensation water condensed at the heat exchanger 41 downward moves along the second recovery pipe 80, and may be cooled by being heat-exchanged with the refueling water at the time of passing through the IRWST 30. The steam or condensation water cooled by passing through the IRWST 30 may be collected to the lower containment area 20.

Another side of the first pipe may be positioned so that its height from the bottom surface of the IRWST 30 is higher than the second recovery pipe 80.

One side of the third recovery pipe 90 is connected to the heat exchanger 41, and another side of the third recovery pipe 90 is connected to the inside of the radioactive substance reduction tank 50. A third valve 90a may be installed at the third recovery pipe 90 so as to open and close the third recovery pipe 90. Steam or condensation water condensed at the heat exchanger 41 may be discharged to the cooling water 50' stored in the radioactive substance reduction tank 50. The aforementioned check valve 25a, steam valve 60a, first valve 70a, second valve 80a, and third valve 90a are selectively open and closed in a preset order when an accident occurs at the nuclear plant 100.

The first to third recovery pipes 70, 80, 90 may be independently separated from the heat exchanger 41 to thus be connected to the IRWST 30, the lower containment area 20, and the radioactive substance reduction tank 50, respectively. Alternatively, the first to third recovery pipes may be extended from the heat exchanger 41 as a single pipe, and may be respectively diverged at positions having different heights from the bottom surface of the IRWST 30. In this embodiment, the first to third recovery pipes 70, 80, 90 are extended from the heat exchanger 41 as a single pipe, and are respectively diverged at positions having different heights from the bottom surface of the IRWST 30.

Hereinafter, an operation of the long-term cooling system of the nuclear plant 100, performed when an accident occurs at the nuclear plant 100 will be explained. FIG. 1B is an operational state view showing that steam of the lower containment area 20 is discharged to the IRWST 30 through the discharge pipe 25 at an early stage of a nuclear accident in FIG. 1A. FIG. 1C is an operational state view showing that steam of the lower containment area 20 is discharged to the IRWST 30 through the discharge pipe and the first recovery pipe in a predetermined time after an accident which occurred at the nuclear plant 100 in FIG. 1A.

FIG. 1D is an operational state view showing that steam of the lower containment area 20 is discharged to the IRWST 30 through the second recovery pipe 80 via the emergency cooling tank (ECT), in three days after an accident which occurred at the nuclear plant 100 in FIG. 1A.

In a case where a steam pressure inside the lower containment area 20 is increased to a level more than a preset value at an early stage of a design basis accident on the nuclear plant 100, the check valve 25a of the discharge pipe 25 is open by a difference between the steam pressure inside the lower containment area 20 and a pressure of the refueling water operated at the injection portion 251.

If the steam pressure inside the lower containment area 20 is higher than the pressure of the refueling water operated at the injection portion 251, the check valve 25a is open, and steam inside the first lower containment area 201 downward moves towards the injection portion 251 along the discharge pipe 25.

The steam of the lower containment area 20 is injected to the refueling water through the injection holes 252 of the injection portion 251.

If a pressure of the reactor coolant system 21 is increased to a level more than a preset value in a predetermined time after an accident which occurred at the nuclear plant 100, the automatic depressurization system 22 is operated. As a result, steam of the reactor coolant system 21 upward moves along the depressurization pipe 221 to thus move to an upper space of the second lower containment area 202.

The steam of the second lower containment area 202 moves along the steam pipe 60 connected to the second lower containment area 202, thereby being introduced into the heat exchanger 41. The heat exchanger 41 inside the emergency cooling tank 40 condenses the steam of the second lower containment area 202 and the cooling water of the emergency cooling tank 40 by a heat-exchange, thereby cooling the steam of the second lower containment area 202.

The steam or the condensation water condensed at the heat exchanger 41 moves to the IRWST 30 along the first recovery pipe 70, thereby being collected to the refueling water.

If the steam of the second lower containment area 202 is discharged to the refueling water through the discharge pipe 25 and the first recovery pipe 70, a steam pressure of the lower containment area 20 is lowered and a level of the refueling water is increased. If the level of the refueling water is increased, the pressure of the refueling water of the IRWST 30 is increased. As a result, the steam discharge through the discharge pipe 25 is decreased, and may be stopped after all. Here, the steam discharge may be performed only through the first recovery pipe 70.

In a predetermined time (e.g., three days) after an accident which occurred at the nuclear plant 100, the steam or the condensation water condensed at the heat exchanger 41 downward moves along the second recovery pipe 80, and moves along the second recovery pipe 80 which passes through the IRWST 30. As a result, the steam and the refueling water are heat-exchanged with each other.

The heat-exchanged steam is cooled to be collected to the inside of the first lower containment area 201.

In three days after an accident occurrence, the steam or the condensation water condensed at the heat exchanger 41 downward moves along the third recovery pipe 90, and is collected to the radioactive substance reduction tank 50.

In the long-term cooling system of the nuclear plant 100 according to the present disclosure, steam inside the lower containment area 20 is moved along the discharge pipe 25, the first recovery pipe 70, the second recovery pipe 80, and the third recovery pipe 90. This may allow a long-term cooling operation to be performed sequentially without large-scale cooling facilities of sea water, thereby enhancing a safety of the nuclear plant 100.

Long-term cooling of steam through the discharge pipe 25 and the first to third recovery pipes 70, 80, 90 may be performed by a passive driving power by a heat source occurring when a design basis accident occurs at the nuclear plant 100. Thus, the long-term cooling system of the nuclear plant 100 according to the present disclosure may exclude an additional power source such as an electric power.

Further, since long-term cooling of steam through the discharge pipe 25 and the first to third recovery pipes 70, 80, 90 is performed by an air cooling, construction costs of the nuclear plant 100 can be saved by excluding large-scale facilities for sea water cooling when constructing the nuclear plant 100. Further, even when there is no sea water near the nuclear plant 100, the nuclear plant 100 can be constructed, and limited conditions of a site of the nuclear plant 100 can be mitigated.

A long-term cooling method of the nuclear plant 100 may include a first cooling step, a second cooling step and a third cooling step.

Referring to FIG. 1B, in the first cooling step, steam inside the lower containment area 20 may be discharged to the refueling water 30' accommodated in the IRWST 30, thereby cooling the inside of the lower containment area 20.

More specifically, steam generated from the inside the lower containment area 20 when a design basis accident occurs at the nuclear plant 100 may be steam generated due to damage of the reactor coolant system 21 or the pipes. And the steam may be steam containing radioactive substances. Hereinafter, steam generated when an accident occurs at the nuclear plant 100 means pure steam or steam containing radioactive substances.

Steam generated when a design basis accident occurs at the nuclear plant 100 is discharged to the inside of the lower containment area 20. Especially, since the steam is discharged to an upper part of the lower containment area 20 through the automatic depressurization system 22, a large amount of steam may be formed at the upper part of the lower containment area 20.

A pressure difference between the first space 20a (the inside of the lower containment area 20) and the IRWST 30, due to steam generated when a design basis accident occurs at the nuclear plant 100. As a result, steam which is at the upper part of the first lower containment area 201 is discharged to the refueling water 30' accommodated in the IRWST 30, thereby cooling the inside of the lower containment area 20. As a result, an inner temperature of the lower containment area 20 may be lowered, and an internal pressure of the lower containment area 20 may be also lowered.

That is, as the check valve 25a is open, the steam inside the lower containment area 20 is condensed at the refueling water 30' to thus cool the inside of the lower containment area 20. Further, the steam discharged to the refueling water 30' may be condensed to form condensation water. The condensation water formed by passing through the refueling water may be accommodated in the IRWST 30.

Steam or radioactive substances not condensed at the refueling water 30' may be introduced into the cooling water of the radioactive substance reduction tank 50 through the steam intake pipe 51, and may be condensed. Further, the radioactive substances may be collected after being dissolved by the cooling water of the radioactive substance reduction tank 50.

Referring to FIG. 1C, in the second cooling step, steam inside the lower containment area 20 is heat-exchanged with emergency cooling water, after passing through the heat exchanger 41. Then, the steam may be discharged to the refueling water 30' along the first recovery pipe 70, thereby cooling the lower containment area 20. As a result, an inner temperature of the lower containment area 20 may be lowered, and an internal pressure of the lower containment area 20 may be also lowered.

The second cooling step is for cooling the first space 20a by operating the internal pressure of the lower containment area 20 at 160 kPa, and thereby the internal pressure of the lower containment area 20 is drastically lowered. A change of the internal pressure of the lower containment area 20 according to the long-term cooling system of the nuclear plant 100 will be explained with reference to FIG. 2. In the second cooling step, steam not condensed at the refueling water 30' may be condensed at the radioactive substance reduction tank 50, similar to the aforementioned first cooling step. Further, radioactive substances may be collected after being dissolved in the radioactive substance reduction tank 50.

For the second cooling step, the steam valve 60*a* and the first valve 70*a* are open. Accordingly, the steam inside the lower containment area 20 may be heat-exchanged at the heat exchanger 41 to thus be condensed. Then, the steam may be discharged to the refueling water 30', thereby cooling the inside of the lower containment area 20. As a result, an inner temperature of the lower containment area 20 may be lowered, and an internal pressure of the lower containment area 20 may be also lowered.

The steam which passes through the heat exchanger 41 in the second cooling step is heat-exchanged with the emergency cooling water 40' accommodated in the ECT 40. Thus, the temperature of the emergency cooling water 40' may be increased. Since the emergency cooling water 40' having its temperature increased is discharged to the air through the ECT 40 and is cooled, steam generated when an accident occurs may be cooled continuously.

At the early stage of the second cooling step, the first cooling step may be performed simultaneously. As a result, the temperature and the pressure inside the lower containment area 20 may be lowered effectively. However, as the first cooling step is performed continuously, steam generated when an accident occurs may be directly condensed at the refueling water 30' and thus a level of the refueling water 30' may be increased. This may cause the pressure of the second space 20*b* to be increased.

A design pressure of the containment 10 which accommodates the second space 20*b* is set to be lower than a design pressure of the lower containment area 20. Thus, in order to prevent steam and radioactive substances generated when an accident occurs from leaking to the outside, a pressure of a predetermined level needs to be maintained. If the level of the refueling water 30' is increased as the steam is directly condensed at the refueling water 30', the check valve 25*a* is closed. That is, as the check valve 25*a* is closed, the steam discharge through the injection portion 251 is stopped.

More specifically, at the early stage of the second cooling step, the steam discharge is performed through the injection portion 251 and the first recovery pipe 70. However, if the level of the refueling water 30' is increased, the steam discharge is performed only through the first recovery pipe 70.

Referring to FIG. 1D, in the third cooling step, steam inside the lower containment area 20 is heat-exchanged, after passing through the heat exchanger 41. Then, the steam is re-cooled by being heat-exchanged with the second recovery pipe which passes through the refueling water 30'. Thus, the steam condensed by a heat exchange with the heat exchanger 41 and the refueling water 30' is re-supplied into the first space 20*a*, thereby cooling the inside of the lower containment area 20. As a result, the inner temperature of the lower containment area 20 may be lowered, and the internal pressure of the lower containment area 20 may be also lowered.

Especially, the third cooling step is performed in three days after a design basis accident, for cooling the inside of the lower containment area 20. The time in three days after a design basis accident is a time requested by restriction requirements when an accident occurs. For three days after a design basis accident, the reactor needs to be safely maintained only with a natural force, without a driving source or without an operation of a system which utilizes an emergency generator.

However, in three days after a design basis accident, a power system, a driving source or the like may be normally operated, for operation of a safety system utilizing them. Thus, in the third cooling step, a closed loop is formed by the second recovery pipe which passes through the heat exchanger 41 and the refueling water 30', thereby sufficiently cooling the inside of the lower containment area 20 by a heat exchange.

For the third cooling step, the steam valve 60*a* and the second valve 80*a* are open. As a result, steam inside the lower containment area 20 may be condensed by being heat-exchanged at the heat exchanger 41 and the refueling water 30', and then may be resupplied into the lower containment area 20 to thus cool the inside of the lower containment area 20. Accordingly, the inner temperature of the lower containment area 20 may be lowered, and the internal pressure of the lower containment area 20 may be also lowered.

Referring to FIG. 2, illustrated is a graph showing a change of a pressure of each region according to a time at the time of cooling the nuclear plant 100 by the nuclear reactor long-term cooling system of the present disclosure when a design basis accident occurs at the nuclear plant 100.

When a design basis accident occurs at the nuclear plant, the first space 20*a* indicated as 'LCA' on the graph has a drastic pressure increase. Then, the pressure inside the IRWST 30 indicated as 'IRWST', and the pressure of the second space 20*b* indicated as 'UCA' are formed in order. The pressure of 'RRT' is formed similar to the pressure of the second space 20*b* indicated as 'UCA'. That is, the pressure increased when a design basis accident occurs at the nuclear plant is the highest at the first space 20*a* indicated as 'LCA', the IRWST 30 indicated as 'IRWT', and the second space 20*b* indicated as 'UCA', in order. This is related to a sealing structure of the lower containment area 20 for preventing steam and radioactive substances from leaking to the second space 20*b* when an accident occurs at the nuclear plant 100.

If the first space 20*a* has a drastic pressure increase at an early stage of a design basis accident, the first cooling step is performed and the pressure is continuously increased. And when the pressure inside the lower containment area 20 is 160 kPa, the second cooling step may be performed. As a result, the pressure inside the lower containment area 20, drastically increased at an early stage of a design basis accident which occurred at the nuclear plant may be stably lowered.

At an early stage of the second cooling step, the first cooling step and the second cooling step shown in FIGS. 1B and 1C may be simultaneously performed to prevent the drastic pressure increase of the first space 20*a*. However, in this case, hazards of the nuclear plant 100 may be increased due to a level increase of the refueling water 30'.

Accordingly, the second cooling step is performed, and the first cooling step is terminated when the pressure inside the lower containment area 20 is lowered to about 190 kPa. Since only the second cooling step shown in FIG. 1C is performed, a small amount of pressure increase occurs until three days after the occurrence of an accident.

Then, in three days after the accident, a driving source is used or a system utilizing an emergency generator is operated. As a result, a long-term cooling having the third cooling step may be performed.

FIG. 3 is an operational state view showing that steam of the lower containment area 20 is discharged to the radioactive substance reduction tank 50 through the third recovery pipe 90 via the emergency cooling tank (ECT) 40 when a severe accident occurs at the nuclear plant 100 in FIG. 1A.

Referring to FIG. 3, when a severe accident occurs at the nuclear plant 100, the steam valve 60a and the third valve 90a may be open to perform a long-term cooling operation for cooling the first space 20a, the inside of the lower containment area 20. When a severe accident occurs at the nuclear plant 100 and when the aforementioned design basis accident occurs, additionally-generated hydrogen may be accumulated with steam and radioactive substances generated at the first space 20a.

That is, when a severe accident occurs at the nuclear plant 100, steam, radioactive substances and hydrogen of the first space 20a are heat-exchanged at the heat exchanger 41, and are discharged to the cooling water 50' accommodated in the radioactive substance reduction tank 50. This can prevent the steam, radioactive substances and hydrogen from being discharged into the IRWST 30.

If hydrogen is discharged to the refueling water 30' accommodated in the IRWST 30 as the steam valve and the first valve are open similar to the first cooling step when a severe accident occurs at the nuclear plant 100, the hydrogen is accumulated on the IRWST 30, resulting in increasing a probability of explosion.

Referring to FIG. 3 back, when a severe accident occurs at the nuclear plant 100, the steam valve 60a and the third valve 90a may be open to perform a cooling operation for discharging steam, radioactive substances and hydrogen condensed at the heat exchanger 41 to a large space such as the second space 20b.

More specifically, steam can be condensed at the heat exchanger 41 to thus be cooled, thereby lowering a temperature and a pressure. Radioactive substances can be dissolved at the cooling water 50' representing the alkalinity, thereby having its amount reduced. Further, hydrogen can be discharged to the second space 20b, a larger space than the first space 20a, thereby reducing a probability of explosion.

It will be apparent to those skilled in the art that the present invention may be embodied in other specific forms without departing from the spirit or essential characteristics thereof.

Also, all changes and modifications that fall within the metes and bounds of the claims, or equivalents of such metes and bounds are therefore intended to be embraced by the appended claims.

The invention claimed is:

1. A nuclear reactor cooling system, comprising:
a containment area formed to enclose a reactor coolant system, and configured to prevent steam containing radioactive substances generated from the reactor coolant system from leaking to a path other than a discharge unit;
an In-Containment Refueling Water Storage Tank (IRWST) disposed outside the containment area, and having refueling water stored therein; and
a discharge pipe configured to connect the containment area to the IRWST, and to discharge steam of the containment area to the refueling water when an accident occurs,
wherein the discharge unit comprises the discharge pipe, further comprising:
a radioactive substance reduction tank disposed at a higher position than the IRWST in a spaced manner, and configured to store therein cooling water; and
a steam intake pipe having one side connected to an upper space of the IRWST, and another side extended to inside of the radioactive substance reduction tank, and configured to introduce steam discharged to the upper space from the IRWST into the cooling water of the radioactive substance reduction tank.

2. The nuclear reactor cooling system of claim 1, further comprising an injection portion formed at an end part of the discharge pipe and configured to inject the steam which flows along the discharge pipe to the refueling water.

3. The nuclear reactor cooling system of claim 1, wherein one side of the discharge pipe is connected to the containment area which is at a higher position than a level of the refueling water, and another side of the discharge pipe is connected to a lower part of the IRWST which is at a lower position than the level of the refueling water, and
wherein steam is discharged to the refueling water by a difference between an internal pressure of the containment area and a pressure of said another side of the discharge pipe.

4. The nuclear reactor cooling system of claim 2, wherein the injection portion is arranged near a bottom surface of the IRWST, is extended in parallel to the bottom surface, and is provided with a plurality of injection holes.

5. The nuclear reactor cooling system of claim 1, wherein a check valve is installed at the discharge pipe so as to prevent a backflow of the refueling water from the IRWST to the containment area.

6. The nuclear reactor cooling system of claim 1, wherein the containment area includes:
a first containment area formed to enclose the reactor coolant system; and
a second containment area communicated with the first containment area, and formed to enclose a safety injection system for safely injecting emergency cooling water to the reactor coolant system when an accident occurs.

7. The nuclear reactor cooling system of claim 6, wherein the safety injection system is provided with at least one of a safety injection tank and a core makeup tank each connected to the reactor coolant system.

8. The nuclear reactor cooling system of claim 6, wherein the second containment area is disposed at a higher position than the first containment area,
wherein an automatic depressurization system for lowering a pressure of the reactor coolant system is accommodated in the second containment area, and
wherein one side of the automatic depressurization system is connected to an upper part of the reactor coolant system, another side of the automatic depressurization system is extended to an upper part of the second containment area, and the automatic depressurization system is configured to discharge steam of the reactor coolant system to the second containment area from the first containment area.

9. The nuclear reactor cooling system of claim 2, further comprising:
a containment formed to enclose the containment area, and serving as a final containment to reduce radioactive substances; and
an emergency cooling tank storing therein emergency cooling water and having therein a heat exchanger for heat-exchanging between the emergency cooling water and steam transmitted from the containment area.

10. The nuclear reactor cooling system of claim 9, wherein the emergency cooling tank is arranged outside the containment at a higher position than the IRWST.

11. The nuclear reactor cooling system of claim 9, wherein the emergency cooling tank further includes therein a cooling water supplement pipe for supplementing emergency cooling water supplied from the outside.

12. The nuclear reactor cooling system of claim 9, further comprising:
    a steam pipe configured to connect the containment area to the heat exchanger; and
    a first recovery pipe configured to connect the heat exchanger to the IRWST, and disposed at a higher position than the injection portion from a bottom surface of the IRWST.

13. The nuclear reactor cooling system of claim 12, wherein the discharge pipe discharges the steam from the containment area to the refueling water at an early stage of an accident, and
    wherein the steam is discharged to the refueling water through first recovery pipe at a preset time after the early stage of the accident.

14. The nuclear reactor cooling system of claim 13, wherein the steam of the containment area is discharged to the refueling water through the discharge pipe to thus be condensed, and the steam discharged through the discharge pipe is stopped, as a water level of the IRWST is increased, and
    wherein the steam of the containment area is introduced into the heat exchanger along the steam pipe to thus be condensed by the heat exchanger.

15. The nuclear reactor cooling system of claim 12, further comprising a second recovery pipe configured to connect the heat exchanger to a lower part of the containment area, extended by passing through the IRWST, and configured to heat-exchange steam condensed by the heat exchanger with the refueling water and collect the steam to the lower part of the containment area.

16. The nuclear reactor cooling system of claim 12, wherein
    the radioactive substance reduction tank is disposed to be spaced apart from the IRWST in the containment.

17. The nuclear reactor cooling system of claim 16, wherein the steam intake pipe includes:
    a first steam intake pipe upward extended from a bottom surface of the radioactive substance reduction tank, above a water surface of the radioactive substance reduction tank; and
    a second steam intake pipe having one side connected to an upper end of the first steam intake pipe, and another side downward extended to the bottom surface of the radioactive substance reduction tank so as to be adjacent to the bottom surface, and communicated with the inside of the radioactive substance reduction tank.

18. The nuclear reactor cooling system of claim 16, further comprising a second recovery pipe configured to connect the heat exchanger to the radioactive substance reduction tank, and to discharge steam condensed by the heat exchanger to the radioactive substance reduction tank.

* * * * *